J. H. GAREY.
POP COOLER.
APPLICATION FILED JULY 6, 1911.

1,021,670.

Patented Mar. 26, 1912.

WITNESSES
E. M. Callaghan
J. W. Brock

INVENTOR
JOHN H. GAREY
BY Munn & Co.
ATTORNEYS

UNITED STATES PATENT OFFICE.

JOHN H. GAREY, OF DAVENPORT, NEBRASKA.

POP-COOLER.

1,021,670.     Specification of Letters Patent.     Patented Mar. 26, 1912.

Application filed July 6, 1911. Serial No. 637,062.

*To all whom it may concern:*

Be it known that I, JOHN H. GAREY, a citizen of the United States, and a resident of Davenport, in the county of Thayer and State of Nebraska, have invented a new and Improved Pop-Cooler, of which the following is a full, clear, and exact description.

My invention relates to improvements in devices for keeping cool pop, soda water, ginger ale and other beverages and has for its object to provide a device which shall be simple, cheap and efficient and one in which the beverage to be dispensed can be readily cooled and conveniently handled.

My invention consists in certain novel features of construction, arrangement and combination of parts as will be hereinafter fully described and pointed out in the claims, reference being had to the accompanying drawing in which—

Figure 1:
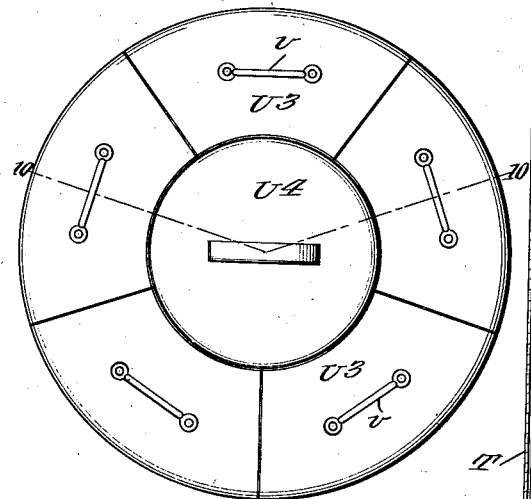
Figure 2:
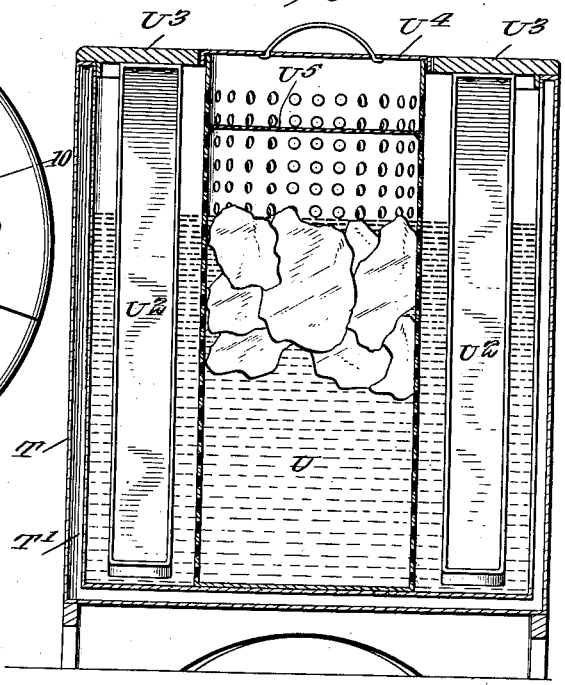
Figure 3:
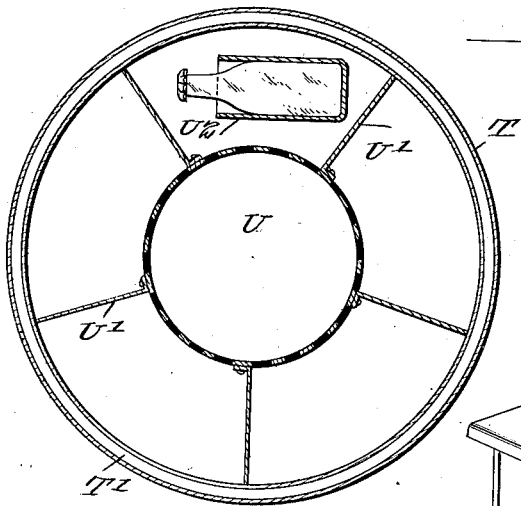
Figure 4:
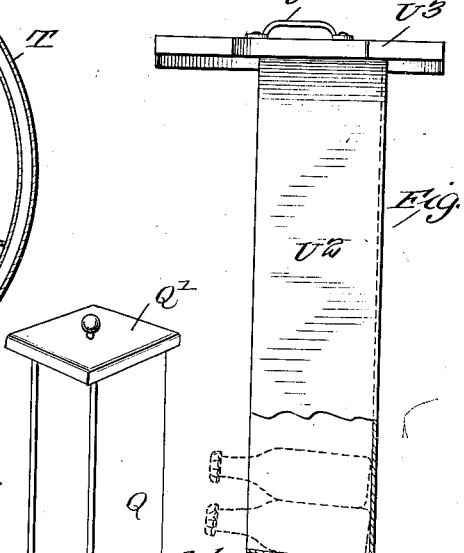
Figure 5:
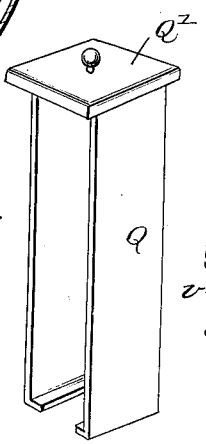

Figure 1 is a top plan view of my improvement made in circular form; Fig. 2 is a vertical section of this form; Fig. 3 is a horizontal section of this form; Fig. 4 is a view partly in section of a bottle tray; Fig. 5 is a perspective view of one form of bottle tray.

In carrying out my invention I use preferably a form of device which comprises a circular receptacle T having an annular dead air space T' and a central circular chamber U having perforated walls within which chamber is placed the ice and ice water. Between the perforated central chamber U and the dead air space are vertical walls or partitions U' rigidly secured to each dividing the space between the central chamber and the dead air space into a number of vertical compartments in which are to be placed the bottle holding trays $U^2$, said trays having at one end the segmental pieces $U^3$ which form lids or covers for the space to contain the bottles, each lid having a handle $u$ by which the trays may be withdrawn when it is desired to get a bottle out of the tray, the trays also having their said lower walls $u'$ slightly inclined so as to confine the bottles in the trays and prevent them accidentally slipping out. The central chamber U has a handled removable cover $U^4$ by means of which the refrigerant may be placed in said chamber.

As shown in Fig. 2 a removable shelf $U^5$ may be placed in the central chamber U upon which may be placed crushed ice or anything that it may be desired to keep cool and also to be ready at hand when wanted.

The trays used may be of the form shown or they may be of any suitable construction.

It will thus be seen that I provide a device whereby bottles of pop or other beverages or liquids may be kept cool and may be conveniently and quickly gotten at without putting hands into water or into ice.

By the use of my improvement, the pop or other liquid may be kept much colder than is possible in devices where the bottles are placed on trays or in separate compartments, as in my device the bottles can be kept completely submerged in ice water until ready for use.

In my improved coolers either dead air spaces or non-conducting fillings may be used.

The names of the flavors used are to be painted or labeled on the lid $U^3$.

The capacity of my improved device is much greater than the devices commonly used.

I claim:—

1. A cooler for bottled liquids, consisting of a receptacle, a refrigerant chamber within the receptacle, a bottle receiving chamber separated from the refrigerant chamber by a foraminous partition, and removable bottle containing trays adapted to be introduced into the bottle receiving chamber.

2. A cooler for bottled liquids consisting of a receptacle, a central refrigerant chamber surrounded by foraminous walls, bottle receiving chambers surrounding said central chamber, bottle carrying trays adapted to be introduced into the bottle chambers, and means for covering each of the chambers.

3. A cooler for bottled liquids consisting of a circular receptacle, a central circular refrigerant chamber surrounded by a foraminous wall, bottle carrying trays adapted to be inserted in the space between the central chamber and the outer wall of the receptacle, segmental flanges secured to one end of the bottle trays, said segments adapted to form air tight covers for the bottle tray space.

4. A cooler for bottled liquids consisting of a circular, heat-insulated receptacle, a central circular refrigerant chamber therein surrounded by a foraminous wall, radial partitions between the central chamber and the heat insulated wall forming upright compartments, bottle carrying trays adapted to be inserted in said upright compartments, the upper ends of the bottle trays having segmental overhanging flanges adapted to cover the upper open end of the compartments, the segments fitting together to form a circular cover for the several compartments, and a removable cover for the central circular chamber.

5. A cooler for bottled liquids comprising a receptacle having a chamber to contain water and ice, a chamber to receive bottles carried in upright trays, and a foraminous partition separating said chambers.

6. A cooler for bottled liquids comprising a receptacle, an ice and water chamber therein, a bottle receiving compartment therein, a foraminous partition separating said chambers, and a detachable shelf supported in the ice and water chamber.

JOHN H. GAREY.

Witnesses:
H. B. JENNINGS,
M. M. JENNINGS.